(Model.)

L. C. WELTNER.
WELL DRILLING MACHINE.

No. 299,306. Patented May 27, 1884.

Witnesses.
Louis F. Gardner
Thos. Johnston.

Inventor.
L. C. Weltner,
per
F. A. Lehmann,
Atty.

UNITED STATES PATENT OFFICE.

LEBBEUS C. WELTNER, OF UNIONTOWN, PENNSYLVANIA.

WELL-DRILLING MACHINE.

SPECIFICATION forming part of Letters Patent No. 299,306, dated May 27, 1884.

Application filed November 9, 1882. Renewed January 24, 1884. (Model.)

*To all whom it may concern:*

Be it known that I, LEBBEUS C. WELTNER, a citizen of the United States, residing at Uniontown, in the county of Fayette and State of Pennsylvania, have invented certain new and useful Improvements in Well-Drilling Machines, of which the following is a specification, reference being had therein to the accompanying drawings.

My invention relates to an improvement in well-drilling machines; and it consists in the combination of parts hereinafter described.

The accompanying drawings represent my invention.

Figure 1:
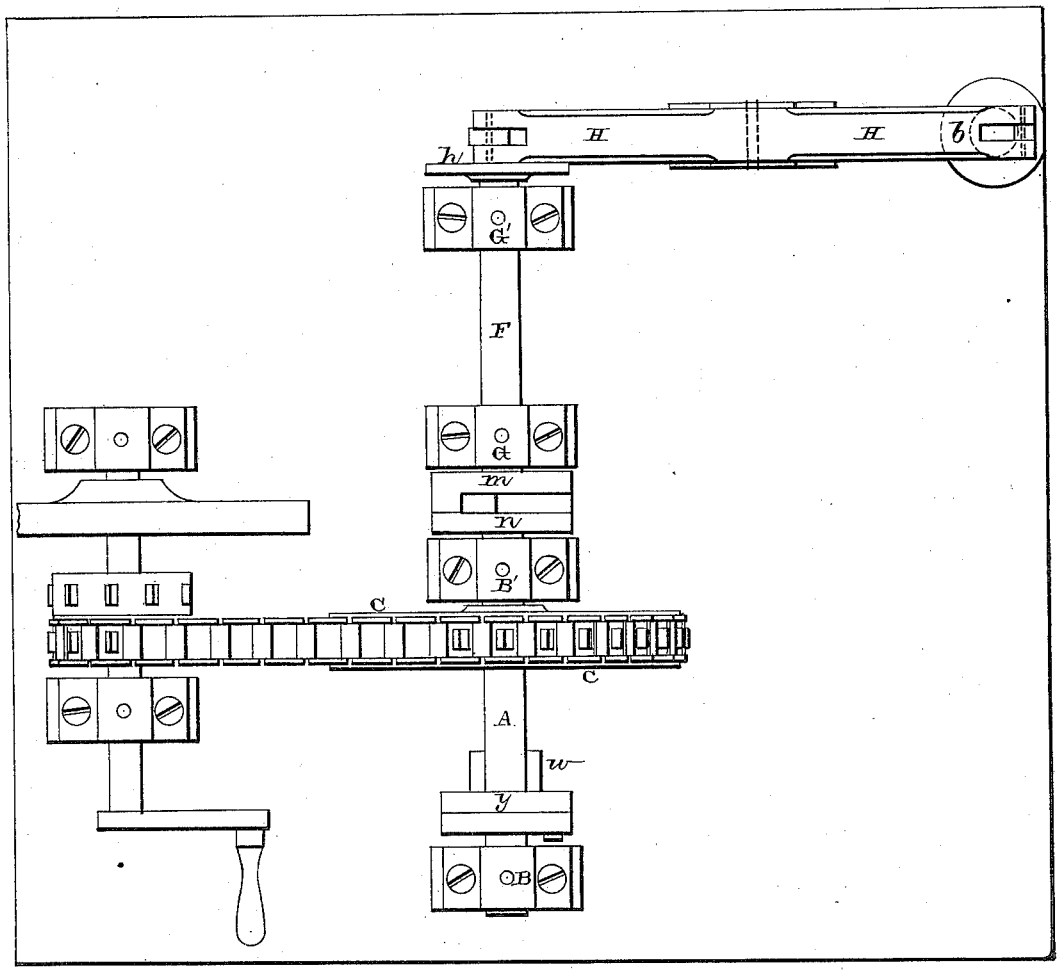
Figure 2:
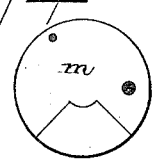
Figure 3:
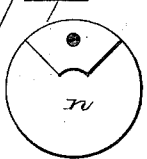
Figure 4:
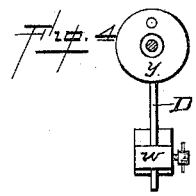

Figure 1 is a plan view of a machine embodying my invention. Figs. 2, 3, 4 are detail views.

The shaft A is journaled on two supports, B B', one end of it extending beyond its support for the attachment of a clutch, $n$. On the shaft, between its supports, is a driving-wheel, C, and a clamped collar, $y$, from which a rod, D, with an adjustable weight, $w$, projects. The clutch $n$ engages a similar one, $m$, on a loose shaft, F, in a line with the shaft A. The shaft F is also journaled on two supports, G G', and provided on its outer end with a crank, $h$, to which one arm of a walking-beam, H, is attached by means of a rod. On the other arm, $b$, of the walking-beam are suspended the tools for drilling the well. Three-fourth parts of the faces of the clutches $m$ and $n$ are cut down, so as to leave one-fourth on each higher than the other part. The elevated portions on the face of the clutches have square shoulders that bear against one another during part of a revolution of the shaft A, or until the elevated quadrant on the face of the clutch $m$ has passed the center or dead point, when by its own weight the tool on the arm $b$ of the walking-beam H, that was raised during the revolution by the crank $h$, suddenly drops, and in dropping accelerates the motion of the clutch $m$ ahead of the following clutch $n$. The shaft F then remains stationary, while the shaft A completes its revolution and again causes the clutches to engage and repeat the same operation. In the cut-away parts of both clutches are holes for the insertion of pins to cause both shafts to revolve continuously together to raise tools that may have dropped in the well and for other purposes. The weight $w$ on the rod D can be shifted to increase or decrease its leverage for assistance in turning the shaft A, whose power may thereby be doubled, thus saving one-half of the fuel for the required motive power.

I am aware that two disks having suitable abutments on their inner sides have been arranged on a single shaft, and this I disclaim. My invention consists in using two independent shafts, each one of which is provided with a clutch.

Having thus described my invention, I claim—

1. In a machine for drilling wells, the two independent shafts, A and F, carrying at their ends the clutches $m$ $n$, operating substantially as described.

2. The combination of the shafts A F, driving-wheel C, weighted rod D, clutches $m$ $n$, and crank $h$, all arranged substantially as described.

In testimony whereof I affix my signature in presence of two witnesses.

LEBBEUS C. WELTNER.

Witnesses:
N. RAIBER,
T. F. LEHMANN.